Patented Dec. 29, 1931

1,839,059

UNITED STATES PATENT OFFICE

ROY G. TELLIER, OF WARREN, PENNSYLVANIA, ASSIGNOR TO FRED B. JACKSON, OF WARREN, PENNSYLVANIA

SUBSTANCE PREPARATION

No Drawing.    Application filed February 4, 1927. Serial No. 166,014.

Among substances at present in extensive use in the decolorization and purification of solutions and other liquids, there may be mentioned bone-charcoal and natural clay; and one of the kinds of natural clay commonly employed for this purpose is that called fuller's earth, a hydrous aluminum silicate, one of the purest forms of which is found in nature as kaolin. Natural clay is not found in use in the filtration of aqueous solutions (e. g., sugar solutions); for, when natural clay, in granular form, is subjected to the percolating action of an aqueous solution, the structure of the clay is broken down and the clay is transformed into a mud through which the solution is unable to pass; and this is what is meant hereinafter when natural clay is said to be water-disintegrative. But clay does not disintegrate from its granular form, when it is subjected to percolation by oils (from whatever source derived), or solutions or melted forms of fats, waxes or greases (of whatever origin). Extensive beds, deposits or mines of clay are found in several places throughout this country and the large supply of it brings about its comparatively low cost to the user. The great disparity in the market prices of bone-charcoal and natural clay seems to have been the underlying influence and urge in efforts (such as that disclosed in the Cheseborough British Patent, No. 8561 of 1898) so to modify natural clay by treatment as to make it fit for use, in granular form, in the decolorization and purification of aqueous solutions by filtration thereof.

This invention relates to improvements in the preparation of composite colloid gels, and particularly to improvements in the preparation of inorganic-and-organic colloid gels, and of inorganic-and-carbon set-gels therefrom, and to the new substances resulting from such processing.

One object of this invention is the provision of a homogeneous non-water-disintegrative inorganic-and-carbon set-gel for the decolorization, clarification and purification of aqueous solutions (e. g., raw-sugar solutions), and for other purposes hereinafter specified.

In one way of carrying out this invention, inorganic matter (e. g., clay) is liquid-dispersed to colloidal (i. e., practically submicroscopic) dimensions by the action of physical means, or of chemical means, or of a combination of physical and chemical means; and this matter, while so dispersed, is mingled and admixed with organic (i. e., carbon-containing) matter that is likewise liquid-dispersed to colloidal dimensions (e. g., an aqueous solution of organic matter). In the presence of pectizing principle, in this mixture, there takes place a coalescing therefrom of the inorganic and organic matter submicroscopically dispersed in the liquid medium, with the result that there forms a composite inorganic-and-organic colloid gel; and this gel is a hydrogel, in case water is the dispersion medium for the matter. The gel thus formed is homogeneous; and it will be found that the constituents of this gel do not enter into its composition necessarily in stoichiometrical proportions but may enter thereinto in any or all proportions, that is to say, throughout an indefinite range of proportions, just as may the constituents of an alloy enter into the composition thereof. The gel thus obtained is preferably compacted; after which it is subjected to heat-treatment, whereby it is dehydrated and its organic component is charred, and the gel is converted into a porous non-water-disintegrative inorganic-and-carbon set-gel, which is practically an irreversible gel. The temperatures employed in this heat-treatment are relatively very low, by which it is intended to convey that they may be far below those required ordinarily for fusing and hardening hydrous aluminium silicates and substantially below those which are ordinarily required to dehydrate and brickify such a substance as fuller's earth so as to render it capable of withstanding the disintegrating actions of water and other liquids. Additional porosity is conferred upon the set-gel by washing, preferably with an acidulated solution; after which the set-gel is redried.

It is to be understood that it is not absolutely essential or required that the entire quantity or charge used of either the inorganic-phase raw-material or the organic-phase raw-material be reduced to colloidal (i. e., submicroscopic) dimensions; for, the practice of this invention also contemplates that at least substantially appreciable portions of them may exist in the ultimate product as coarse dispersions, which may be analyzed by the microscope. To illustrate, raw clay of the nature of Florida fuller's earth may, to the amount of ninety per cent. (90%) of its substance, be readily converted into the state of a true colloid, while the remaining ten per cent. (10%) of its substance is made up principally of crystalline and amorphous silicious matter that, since it is not deterimental in the ultimate product, and since its removal, in the processing, would entail labor and introduce complications out of all proportion to the benefit derived, is permitted to enter into and remain in the ultimate product as an impurity.

As to the organic-phase raw-materials, some of them may be reduced to the form of molecular dispersions; for example, sugar may be dispersed to molecular dimensions by its being fully dissolved in water.

As fully appears from the foregoing statement of the discovery upon which this invention is essentially based, it is contemplated to subdivide and disperse to submiscroscopic minuteness, the mineral-phase raw-material of which the new composite ultimate product is, in part, formed. As will more fully appear from the illustrative examples hereinafter set forth, the inorganic-phase raw-material used is of such a nature as to be convertible, by suitable treatment, into a colloid, and it is susceptible of transformation into the required colloidal state (in other words) it is colloid-forming). The change wrought in the inorganic-phase raw-material is effected by dispersion thereof to submicroscopic dimensions, and this dispersion may be accomplished by physical means, or by chemical means, or by a combination of physical and chemical means. The inorganic-phase raw-material, when thus dispersed to a colloidal state of submicroscopic dimensions, is susceptible of peptization to the sol state and of forming therein with the organic-phase raw-material similarly dispersed a pectizable union in the nature of a mutual solution. Florida fuller's earth is one species of the colloid-forming inorganic-phase raw-material that is hereinbefore mentioned. So far as I have been able to determine, such a degree of dispersion is, in the case of anhydrous minerals, somewhat difficult and costly to effect; and considerations of economy dictate the use of minerals of hydrous form, such as hydrous aluminum silicates (or natural clays), of which fuller's earth clays or such clays as possess the essential characteristics and properties commonly ascribed to fuller's earth clays seem to be peculiarly adapted for the purpose. However, there is a wide variety of and difference in these clays, particularly from the standpoint of their physical-nature make-up; and, for the purpose of carrying out this invention, it has been found that some of them will much more simply and cheaply work up than will others. While experiment has demonstrated that it is within the technical range of possibilities to synthesize mineral substances which, for the purpose of this invention, will approximate the essential composition and qualities of fuller's earths, it is thought that the cost of such synthesized mineral substances is too high to warrant their use. Therefore, fuller's earths and similar or related clays are now preferred for use as the mineral-phase raw-material; and it is further preferred to use, in practice, only such fuller's earths as afford the best balance between suitable efficiency of the finished product and low cost of processing; and here will enter into consideration also in what amount the fuller's earth is available, its location and cost of transportation and excavation or mining. Although any variety of fuller's earth may be used as the mineral-phase raw-material in practicing this invention, yet fuller's earth of the nature of Florida fuller's earth, is, so far as is known to me, by far the best adapted of all for the purpose just mentioned; and the reason why this is so may be best shown by contrasting the physical properties of ordinary clays (or fuller's earths) with those of Florida fuller's earth. Ordinary clays, even the most exceptionally fine-grained ones, of which substantially pure kaolin may be named as an example, are composed of very coarse individual grains or particles as compared with true colloidal substances. Practically all these individual grains are not only viewed plainly with an ordinary microscope but the great bulk of them are also plainly visible to the naked eye. These solid particles of mineral matter are very resistant to chemical action capable of effecting molecular transformation and change, and very resistant, too, to any simple or ordinary methods or means of reducing them to true colloidal state or form; and the same would also be true of kieselguhr and of any of the other diatomaceous earths or the amorphous silicas. To disperse them colloidally would involve the employment of costly and laborious processes. Of all the several varieties of fuller's earths, the one that seems best suited for the purpose here in hand is Florida fuller's earth, which is found, in extensive beds, in Gadsen County and counties thereto adjoining, in the State of Florida, and for which there is a great demand for petroleum refining, and of which there is a large tonnage recovered as a fine-mesh undersize material in the production of the granular form. A method in which this fine-mesh undersize material is utilized will, among others, be hereinafter described.

I have discovered that Florida fuller's earth (that is, approximately ninety per cent. of its constituent substance), on subjection to a squeezing and kneading action of sufficient duration, will quite readily undergo physical change to a very exceptionally highly colloidal state, of virtually the consistency and slipperiness of raw white-of-egg. Due to this natural ultra-fine-grained structure of Florida fuller's earth, together with its ultraminute cellular makeup and its corresponding exceptionally great capacity for automatically taking up liquid, there may be carried out, in a comparatively simple and cheap manner and in various ways, those steps of the processing which involve bringing it as the liquid-dispersed mineral-phase raw-material of submicroscopic minuteness, into ultra-subdivided and ultra-intimate proximity with the liquid-dispersed organic-phase raw materials that are used, whereby the desired mingling and combining of the essential submicroscopically-minute particles of the liquid mixture are made possible. Other varieties of fuller's earths, and other minerals, would require much more involved and costly methods and means of processing to accomplish the same ends. Approximately ninety percent. (90%) of Florida fuller's earth may be transformed to true colloidal state or substance; the remaining ten percent. (10%) is principally crystalline and amorphous pure silicious matter and, as that percentage of impurity is not seriously detrimental to the ultimate product, it is allowed to remain therein, by doing which the advantages of simplicity and cheapness of processing are obtained.

So far as the organic-phase raw-materials are concerned, the main requisite is that the organic substance considered for use be capable of being dispersed to colloid-sol state or form in liquid, the kind completely soluble (molecularly dispersed) being preferred. Further, there is no technical limitation to vegetable-nature organic substances; for, there may be used various animal-nature liquid (e. g., melted) forms of substances, such as glues, gelatins and the like, or animal fats and greases, susceptible of being rendered of liquid form; and, more particularly, by reason of possible economy factors and possible large quantity sources of supply, there may be specified as of important example, animal-nature liquids such as waste-sewage effluents from large cities and large industrial plants (e. g., animal packing plants, tanneries, and fish-canning or fish-handling sources). Also, in the vegetable-nature class of substances, there may be pointed out, as possible to use, soil or peat leachings of humus or plant nature, and tannin-nature leachings from forest débris, and other plant, vegetable or fruit decomposition matter when it is available in sufficient quantities. Of value for the purposes of this invention are saccharine liquids, or organic liquids or solutions containing, among other organic substances, appreciable quantities of water-dispersed saccharine matter. Among sources of supply of liquids or waste refuse containing appropriate saccharine matter, of the cheaper order, naturally come waste or semi-waste molasses, syrups, solutions, and pulp residues, residual in raw-sugar factories (both cane and beet), and also from raw-sugar refineries. However, I have definitely discovered and ascertained that we can produce, by chemical means, very appropriate organic liquids and compounds from substances such as sawdust or other waste wood or timber products (or the entire wood may be worked up and used for the purpose), which organic liquids and compounds will contain sufficient amounts of sugar (which is peptizing principle) to meet fully the essential mineral and organic combining requirements for producing the required products; and, in this way, not only may there be provided fully efficient organic-phase raw-materials but also is there likely to be afforded both cheaper and more dependable large-quantity supply than would be possible for direct saccharine-containing substances derived from sources producing cane-sugar and beet-sugar. While, as organic-phase raw-material, almost any kind of wood or plant material will find practical use in carrying out this invention, yet oak and hemlock woods are particularly well fitted for such use, for the reason that they contain a considerable amount of readily extractable and desirable tannin-nature substances (which are peptizing principle); and so, too, are pine and other coniferous woods, because of the relatively large quantities of available resinous matters that they contain. Paper-pulp or ground wood or like cellulosic material may be used as organic-phase raw-material with particular advantage in certain cases that are particularly described hereinafter.

As being of still more specific availability and value (at least for the purposes of this invention), I have found and, by thorough and exhaustive experimentation, testing and actual reduction to practice, I have fully proven, that the waste byproduct known to the arts as waste sulphite liquor (the spent, after-use calcium bisulphite liquid extractions from wood-cooking in the so-called sulphite pulp process, which come in such immense quantities and are allowed to flow to waste from pulp and paper manufacturing plants using the sulphite process) is admirably suited to serve as an organic-phase raw-material in practising this invention, both from the standpoint of high efficiency of finished products and from the several angles of ready availability, availability in large quantities, cheapness of crude product, and simplicity and low cost of utilizing and handling throughout the processing operations (the last-named feature embracing practically complete insurance against fire-hazard, whereas, in the case of wood or kindred products, considerable fire-risks would be involved). The organic solids of this waste sulphite liquor constitute what is practically entirely all the original wood or tree substance except the fiber or cellulose part thereof. About one and one-half per cent. (1½%) of the solids just mentioned is sugar; and this sugar content is increased by the incidental treatment to which the liquor is subjected (as is hereinafter described) in the course of processing it with the mineral-phase raw-material (e. g., clay), which increase of sugar is effected by the action of dilute sulphuric acid (for example) on some of the other organic constituents of the liquor. Thus, there is supplied very cheaply a sufficient quantity of sugar for bringing about the composite mineral-and-organic non-water-disintegrative and chemically and/or physically active products of the processes involved in the practice of this invention.

The balance of the total solids of the liquor is composed of a complex nature of mucilaginous matter, resinous matter (in amount about two per cent. of the total solids), and of gummy or glutinous substances which appear to be more or less the vegetable counterpart of animal albuminous-nature matter. This glutinous (or vegetable albuminous) matter and the resinous matter constitute very valuable components for creating the essential specific cellular make-up of the finished products obtained by the practicing of this invention; otherwise, for the best efficiency of such products, it would be necessary to add to the mix, as a raw material, some glutinous matter (such as that derived from wheat-flour), or some albuminous matter or gelatinous substance (e. g., glue); and such raw-material additions would prove costly.

In some of the ways of practicing this invention, this waste sulphite liquor can be used in just the dilute form in which it comes, without concentration, from the paper-plants. However, in other ways of practicing this invention, it is preferred to have the waste sulphite liquor in a concentrated form. But, if it be attempted to carry the concentration to a point indicated by a reading substantially higher than thirty-two degrees Baumé, some of the solids will begin to separate out and settle, unless substantially impracticable care be taken. The degree of concentration just mentioned favors the simple and cheap removal of a portion of the calcium, which removal is found desirable in the case of some methods of use wherein it is preferred to have a smaller percentage of calcium in the liquor. This removal of the calcium is effected by simply adding to the concentrated liquor, the sulphuric-acid solution (or a part thereof) which is used in the processing hereinafter described; and this addition of the acid is made to the concentrated liquor before the latter is added to the mineral-phase raw-material (e. g., fuller's earth).

In addition to the hereinbefore-mentioned essential constituents of this waste sulphite-liquor, which are peculiarly valuable for the purposes of this invention, the calcium ingredient thereof may also be very effectively and cheaply utilized; this calcium is residual therein from the original calcium-bisulphite solution used for cooking the wood and, in the waste liquor, it appears to be in the form of soluble calcium salts of lignin sulphonic acid. On coming into contact with the sulphuric acid used in the hereinafter-described processing (and apparently augmented by the catalytic action of the colloidally-dispersed clay), these calcium organic salts are quite readily converted over to calcium sulphate, which, as being the most efficient as well as the cheapest, it is preferred to use as the pectizing agent in the transformation to composite hydrogel form in the processing, and as the mordanting principle or agent for the finished products obtained by practising this invention. It has been found that some kind of mordanting principle or agent is a valuable adjunct in most liquid decolorizing and impurity-removing operations by the absorption and adsorption principle or method, and that for some adsorption operations, particularly when certain phases of dissolved color and impurities are to be removed and which would otherwise remain unaffected, the mordanting agent becomes absolutely essential to the accomplishment of the objects sought. Calcium sulphate has been found to be not only a very cheaply applicable mordanting agent but also a powerful and highly efficient one as well, both on aqueous color solutions (e. g., raw-sugar solutions) and, too, on most oils and on various other color-containing liquids. Again, it has been found that (particularly in the case of raw-sugar solutions and other aqueous solutions) calcium sulphate as the mordanting agent is of especial value in that, as it is combined and used as a constituent part of the composite mineral-and-organic chemically and/or physically active products that are obtained by practising this invention, it is not appreciably or detrimentally soluble either in alkaline or neutral aqueous solutions or, more particularly, in saccharine or kindred solutions, which sometimes contain very appreciable amounts of acids; and this property especially fits it for use on such acid-nature solutions. Associated with the calcium sulphate in the finished products there may be aluminum sulphate and small quantities of double alums, all of which are powerful mordanting agents; and, at the conclusion of the heat-treating step in the processes hereinafter described, the calcium sulphate and the associated alums may be in excess of the amount required as mordanting principle. This excess calcium sulphate and the alums associated therewith are removable by simple lixiviation with water down to that definite amount which remains in chemical and/or physical combination with the composite mineral-and-organic product; and this amount of combined calcium sulphate and associated alums is soluble in neither water nor acid-nature saccharine solutions but it remains in the product as the chemically and/or physically active mordanting principle thereof without being dissolved out to pass, as impurity, into the solution being treated.

The mode of treatment to which the hereinbefore-mentioned raw-materials is subjected may, in general terms, be described as follows, to-wit: The mineral-phase raw-material is reduced and dispersed to that degree of submicroscopic subdivision of the particles thereof which enables them to enter into chemical and/or physical union with the water (or liquid) of the liquid dispersion-phase in which the particles are dispersed. In this colloidal state, the mineral-phase raw-material is mingled and admixed with the organic-phase raw-material, which is likewise dispersed to submicroscopic dimensions, that is, colloidally-dispersed, or molecularly-dispersed (for example, by being dissolved in water), to the state of a true hydrosol. Both the inorganic matter and the organic matter being in a state of ultra-subdivision in hydrosol form, these ingredients of the admixture are thus brought into such ultra-proximity that they may be said to dissolve each in the other, and form a union in the nature of a mutual solution. If the admixture contains none of the necessary pectizing principle, then such must be introduced into the admixture, which may be done either as a complete pectizing and mordanting salt, or, else, in such form as will, with the addition of a suitable acid (e. g., sulphuric acid) form such a salt. But the mineral-phase raw-material (e. g., clay) may contain enough pectizing and mordanting sulphates, or, else, elements that, during the dispersion of the raw-material, oxidize to pectizing and mordanting sulphate-form, or, else, sufficient alkaline-earth (e. g., calcium) salt that may be converted into a pectizing and mordanting salt by treatment of the raw-material with a weak acid-solution, so that the pectizing and mordanting agent may be thus adequately provided. The composite substance obtained by the hereinbefore-mentioned admixing and mingling, is seemingly acted upon by various forces and influences, and by the pectizing agent or electrolyte, which serves also, in the finished product as mordanting principle; and, as a result of such action, this composite substance is condensed and concentrated and coagulates out in the form of a colloidal composite mineral-and-organic hydrogel of very high water-content. This composite inorganic-and-organic hydrogel is next freed from the supernatant liquid, after which it may be kneaded and pressed or compacted. Then it is carefully dried and thus partially dehydrated, abundant caution being used that the gel structure of the composite combination be not disrupted. The substance is then subjected to carefully-controlled heat-treatment at temperatures somewhat higher than the temperatures used in the first drying (or known as predrying). This heat-treatment is so conducted as to effect dehydration or carbonization of the organic-phase matter but without effecting oxidation of the carbon or sintering of the component elements. There is thus produced a composite molecular combination of mineral and carbon, which is a true colloidal set-gel and which still contains some water, and possesses, for the purposes in question, very high chemical and/or physical functioning capacities, but which, nevertheless, is, for all practical purposes, essentially non-disintegrative in aqueous solutions, and is, by reason of the colloidal and/or molecular state of combination of the mineral and carbon molecules (that may be likened to an alloy or mutual solution in this particular), very resistant to crushing and other mechanically-breaking-down forces when put to use. For maximum functioning of granular decolorizing materials, two kinds of porosity are essential, namely: (a) That open form of porosity which permits of easy and rapid penetration of the liquids under treatment, to the interiors of the granules; but not an undue open porosity, which would serve no functioning capacity and would result only in the granules being more easily broken down under wear-and-tear. And (b) that which is really not porosity at all as that term is commonly used, but which, as the term is herein now used, is a certain submicroscopic cellular formation, within and upon the walls of which cells the adsorption and the other principles and forces of decolorization (both physical and chemical) are enabled to take place and act. Porosity is conferred upon the finished product, during the processing, in both of two ways, namely: (1) By the change of physical state which the organic-phase elements undergo in the charring thereof during the heat-treatment hereinbefore mentioned. (2) By lixiviation, in those cases in which there is an excess of pectizing and mordanting salt (or salts) left in place in the predrying step and in the heat-treating (or charring) step, to be subsequently leached out by simple lixiviation with water. Therefore, when the material has been heat-treated (i. e., charred) and is in granulated form and of the desired size, the granules so obtained are lixiviated and washed with water (which, for purposes hereinafter set forth, may be acidified) to leach out the excess pectizing and mordanting salt (or salts). Following the leaching and washing step, the material, before its removal from the wash-tank, is preferably blown-out with air or steam in order to remove the bulk of the adhering water; after which the material is emptied onto a belt-conveyor and is thereby taken to the place of redrying and there redried.

In case clays of the nature of Florida fuller's earth (and, of course, Florida fuller's earth itself) are used as the mineral-phase raw-material, the same exceptional porosity of such clays which gives to that type of earth a much greater capacity for taking up liquids without swelling up or having its structural dimensions altered or crumbled down than is known for any other type of clay, permits of simply and quickly bringing the necessary concentrations and proportions or amounts of organic-phase raw-material and acid into immediate juxtaposition, uniformly throughout the entire mass or substance of the clay, with the molecular arrangement of the mineral elements composing the clay. In processing with clays of the nature of Florida fuller's earth as mineral-phase raw-material, the organic-phase raw-material, in liquid form, may be mingled and admixed with a suitable proportion or amount of acid (e. g., sulphuric acid) solution to form a liquid treating-mixture, with which the mineral-phase raw-material (Florida fuller's earth) is treated. This liquid treating-mixture contains strong pectizing salts, which serve in the ultimate product also as mordanting salts, and which are derived from the component solutions of the treating-mixture; and, besides, when the latter is brought into contact with the molecular arrangement of the mineral elements of the mineral-phase raw-material, pectizing salts are spontaneously and concurrently formed as products of the reaction of the acid solution upon that molecular arrangement. Furthermore, at this time, while the mineral elements of the clay, and the organic elements of the organic-phase raw-material solution, and the dissociated ions of the acid solution, are in such intimate or immediate juxtaposition (as just set forth hereinbefore), and the various elements are thus enabled to take advantage of any nascent powers of reaction and of recombination when the cycle of chemical and physical reactions begins, the acid ions begin their molecular decomposition of the molecular arrangement of the mineral elements of the clay and, as the decomposition thereof progresses, the mineral phase is thus dispersed to colloid dimensions; as brought about by the strong pectizing salts (the presence of which has just been accounted for), the resulting composite mineral-and-organic sol (e. g., hydrosol) formation is spontaneously pectized and made to separate out in the form of a composite mineral-and-organic colloid gel (e. g., hydrogel) of very high content of colloidally and physically combined liquid (e. g., water). This composite inorganic-and-organic hydrogel is partially dehydrated by a predrying step, by which it is, in part, converted over to a composite inorganic-and-organic set-gel, a part still remaining in the composite hydrogel state or form; after which this composite colloid partially set gel (e. g., hydro-and-set-gel) is subjected to a heat-treatment step at temperatures sufficiently high to drive off much more of its water and to convert its organic-phase matter to carbon. If this latter step is properly carried out, the resultant substance will have its mineral and carbon molecules mingled and combined somewhat after the manner or state in which the molecules of true metallic alloys are mingled and combined (i. e., a state of union in the nature of a mutual solution) and so that the substance is very hard and durable and capable of withstanding the mechanical wear-and-tear of the many reusings to which it is to be subjected during its life. The substance is next granulated and reduced to desired sizes and is subjected to lixiviation and washing in order to remove the excess pectizing and mordanting salts and thereby to be given a submicroscopic cellular formation additional to that conferred upon it by the change of physical state which the organic-phase elements undergo during the heat-treatment (or charring) step. The material is next blown out with air or steam in order to remove the major part of the adhering water, while it is still in the wash-tank; and it is then redried.

Immediately following there will be described, by way of illustration, several methods of making finished products that may be obtained by practicing this invention. It will be observed that, in the description of some of these methods, different specific substances are indicated as suitable for use as the mineral-phase raw-material and various substances are mentioned as fit for employment as the organic-phase raw-material.

Paper-pulp or ground wood (or other plant or vegetable substance of a cellulose nature) may be used as organic-phase raw-material with particular advantage in some cases, among which may be named, the following, to-wit: (a) When it is desired to obtain a finished product of great lightness, which may be made to result from giving it a relatively more open porosity (e. g., a honeycomb-like structure of exceedingly great fineness); and (b) When it is desired to obtain a finished product of normal specific volume but to use, as mineral-phase raw-material, some kind of clay other than Florida fuller's earth and so of greater density than the density of the latter, and normally productive of or resulting in a finished product that is too heavy and dense for best efficiency and quick action thereof, and furthermore involving labor and expense that would be required to work over and to treat, both mechanically and chemically, this heavier, denser clay so as to alter it and bring it to a different physical form and make it of lighter weight. The paper-pulp, ground wood or similar cellulosic material may be wet-ground sufficiently minute and thus water-dispersed to a pulpy state of colloidal dimensions along with the clay, with which is mixed a solution of sugar (which is peptizing principle) and a pectizing agent (e. g., calcium sulphate) that will serve in the finished product as mordanting principle. Due to the action, upon one another, of these substances in their state of dispersion to submicroscopic subdivision, there results a hydrogel, from which the supernatant liquid is suitably removed. The gel thus obtained is kneaded thoroughly and, after moderate pressing of the kneaded mass, predrying it and then heat-treating it in the manner hereinafter set forth, the resultant intermingled char from the admixed fine pulp does not unduly cut down the non-water-disintegrative phase of the composite mineral-and-carbon substance finally produced; and the hardness and durability of this finished product will be adequate for the certain purposes (e. g., raw-sugar refining) for which it is intended to use it, although, of course, as will be readily understood, the resultant finished product is more readily crushable under weight and pressure and is, therefore, less hard and durable, due to the intermingling therewith of the fine pulp-char. Because this intermingling of the fine-pulp-char does not, for the certain purposes just referred to, affect the chemical and/or physical functioning properties of the composite mineral-and-carbon finished product, and due to the latter's more open structure and greater surface-area, both immediately available for action on the liquid under treatment and affording much easier and quicker penetration of that liquid into its interior structure, the finished product is much more efficient and much quicker in its action than it otherwise would be. This product may be obtained as a result of carrying out the mode of treatment hereinafter set forth, in the description of which laboratory procedure is detailed; large-scale practice would differ for the most part only in amounts used and in equipment. Into a mortar, put one pound (1 lb.) of practically pure clay (kaolin); sugar to the amount of approximately fifteen per cent. (15%) of the weight of the clay; air-dry paper-pulp to the amount of five per cent. to ten per cent. (5%-10%) of the weight of the clay; water in amount to permit of effective grinding and of the clay's being dispersed to the desired colloid state at the conclusion of the grinding, when, for the best results, the pestle-agitated mass should be of the consistency of thin cream; and calcium sulphate to the amount of three per cent. to four per cent. (3%-4%) of the clay, which salt serves, in the admixture, as the essential electrolyte or pectizing agent, and, in the finished product, as the mordanting principle. For this illustrative example, either New Jersey kaolin or Carolina kaolin may be used; but whatever kaolin is used, it is intended that the purest grade practicable to be gotten, be employed for the purpose in hand. As will be readily understood by all those persons who are skilled in the art, various different factors and conditions change and regulate the specific relative proportions that are to be used in actual practice. For example, the weight of air-dried paper-pulp to be used will depend, in part, on the extent to which grinding needs to be carried out (and this is largely determined by the kind of clay used as mineral-phase raw-material), and, in part, on the degree of density (or opposite degree of porosity) desired in the finished product. Wet-grinding, as with a pestle, is now carried out for a period in the neighborhood of one hundred and fifty (150) hours, at the end of which period the wet-ground mass should, for best results, possess the consistency of thin cream. The period of time required for this wet-grinding will depend largely on the physical nature of the clay used as raw-material and on its consequent degree of resistance to being dispersed to the desired state of sub-microscopic subdivision. It would appear that, when the clay is, by the wet-grinding, eventually physically dispersed to ultraminutely subdivided (i. e., submicroscopic) form, these ultraminute clay particles at first, under the strong influence of the action of the peptizing principle present (and present in amount sufficient to overcome the counter-influence of the pectizing electrolyte, calcium sulphate, that is also present), assume a colloid-sol form in the water (that is to say, are converted to hydrosol form), wherein they are enabled to combine (in some manner or other in a state of union in the nature of a mutual solution) with the organic matter (sugar and paper-pulp) that, too, is dispersed to submicroscopic minuteness in the water and that thus is in ultraminute contact with this colloid-sol form of argillaceous mineral matter. It would further appear that, after this sort of combination (the exact nature of which has not yet been definitely ascertained but which is in the nature of a mutual solution and is probably both chemical and physical) is effected, the influence of the electrolyte or pectizing salt (calcium sulphate) present then becomes sufficient to pectize this union of argillaceous and organic hydrosols and convert it over to a colloid hydrogel form of composite inorganic-and-organic substance, which, upon cessation of the wet-grinding, readily settles down to the bottom of the mortar in a jelly-like mass, leaving a substantially clear supernatant liquid that can, without difficulty, be suitably removed therefrom. I believe myself to be the first to produce a composite inorganic-and organic colloid gel, as well as the first to produce a composite argillaceous-and-organic colloid gel. This composite argillaceous-and-organic hydrogel is next thoroughly kneaded, say, for about an hour, after which it is subjected to moderate pressure (say, about one hundred pounds per square inch). Or the supernatant liquid may be filter pressed from off the composite hydrogel. Then the kneaded, pressed mass is subjected to predrying at temperatures not high enough to cause steam-disruption of its gel structure. Predrying temperatures that range from a little below the boiling-point of water to slightly thereabove, are both feasible to employ and technically satisfactory in their action. This predrying may, with advantage, be continued for, say from eight hours to twelve hours, and even a longer period may be required, in case the material to be predried is in the form of a thick mass, that is, is not spread out in thin layers; and it results in driving off some of the water of the composite inorganic-and-organic hydrogel and in transforming a portion of the latter into the set-gel state or form, so that the substance, after being subjected to the predrying for the time stated, is converted into a composite inorganic-and organic colloid partially set gel, to-wit, a composite argillaceous-and-organic hydro-and-set gel. This substance appears dry; and, when it is handled, it acts as does a dry material. I believe that I am the first to produce such a substance, as well as the first to produce a composite argillaceous-and-organic hydro-and-set gel. This predrying step is now followed by heat-treatment at temperatures just high enough to bring about dehydration of the inorganic constituent and to effect carbonization (charring), of the organic constituent of the composite substance, but not high enough to affect detrimentally the chemical and/or physical functioning properties and capacities thereof. In this heat-treating step, both the chemically combined water and the physically combined water of the hydro-and-set gel are driven off, whereby the latter is converted into a composite non-water-disintegrative irreversible colloid set gel, which may be characterized as anhydrous, at the end of this heat-treating step. Heat-treating temperatures ranging, in this case and in other cases generally, from in the neighborhood of three hundred and fifty degrees Fahrenheit (350° F.), at the start, to in the neighborhood of from six hundred degrees to eight hundred degrees Fahrenheit (600 °F.–800° F.), at the conclusion of the heat-treating, are both simply and cheaply applied and satisfactorily adequate for producing best results. The time required for the heat-treatment depends largely upon the size of the mass under such treatment, and also upon whether that mass is allowed to remain at rest in a retort, a covered crucible or other container, or is stirred, or otherwise kept in motion and mixed by suitable agitating mechanism. The actual time required for the heat-treatment may, therefore, range anywhere from, say, half an hour, or even less to two hours, or even more. In any event, appropriate care must be taken so that, with large masses and especially in the case of unstirred masses, the temperature of the exterior of the mass is not allowed to rise high enough to affect detrimentally the material thus exposed before the temperature of the interior of the mass becomes sufficiently high to accomplish the desired results on the material in the interior of the mass. In the case in hand, the organic part of the material (to wit, the sugar and paper-pulp) is of combustible nature; and, in such a case, it is preferable to carry out the heat-treatment in a non-oxidizing atmosphere (e. g., in an oven or a furnace-chamber from which air may be largely excluded). If the heat-treatment is carried out in the presence of too much air, there is tendency to detrimental oxidation of the mineral components (with consequent breaking-up of the composite mineral-and-organic combination); and there is also tendency to excessive ignition of its organic components and to their shrinking away from their union with the mineral part, which would likewise result in the disunion or disintegration of the composite combination. Furthermore, if there is too much oxidation, together with too great or too rapid rise in temperature, a depreciation in the chemical and/or physical activities of the finished product also results. At the same time, a purely reducing atmosphere in the oven or furnace-chamber is not best suited for the purpose here in question; for, such an atmosphere appears also to exert an adverse influence and effect on the chemical and/or physical functioning activities of the ultimate product. For these reasons, it is preferred to employ an ordinarily neutral atmosphere in the oven or furnace-chamber, together with suitable means for escapement of gases and volatile products generated by the material under heat-treatment. However, the conditions hereinbefore described apply more particularly when straight wood-products are used with the clay, or, when, as in the illustrative method hereinbefore set forth and for the reasons given in the foregoing, it is desired to admix paper-pulp, cellulose or other similar substance. The kneaded, pressed and predried composite argillaceous-and-organic hydro- and-set gel of the illustrative method in hand is subjected to heat-treatment at the temperatures hereinbefore mentioned for one hour or thereabout, and with constant stirring by suitable agitating mechanism. At the conclusion of the heat-treatment, much of the water of the substance will be found to have been driven off and the substance to have been fully converted into the state of a composite inorganic-and-carbon colloid, set-gel which is (to use a colloid-chemical term) irreversible. I believe myself to be the first to produce such a composite inorganic-and-carbon set-gel, as well as the first to produce a composite argillaceous-and-carbon set-gel, the constituents of which are in a state of union in the nature of a mutual solution. By this heat-treatment, the excess salts of calcium, aluminium and the like are so affected that they may be leached out in the washing step that follows the heat-treatment. Furthermore, not only is the organic phase of the heat-treated colloid gel carbonized or charred, but the inorganic phase thereof likewise undergoes dehydration. This set-gel will be found to have been given an open porosity by virtue of the change of physical state which the organic-phase raw-materials (sugar and paper-pulp) undergo by reason of the charring thereof during the heat-treatment. Assuming that the ultimate product is to be used in a granular filtration process (as in the refining of raw-sugar), the heat-treated mass is broken into granules of the sizes demanded by the particular purpose in view, after which these granules are lixiviated or washed for the purpose of removing excess calcium sulphate; it will be understood that an excess amount of this salt was purposefully added to the original mixture at the outset. The details of this washing step will be hereinafter set forth in connection with the description of the process in which use is made of Florida fuller's earth "fines". By this washing, an added porosity is conferred upon the material. The washing is continued until substantially all the excess calcium sulphate is leached out, whereupon the material is blown out with air to remove any surplus water remaining therein. After again drying it, the material is ready for use.

In case it is desired to use sawdust or some other wholewood substance as organic-phase raw-material, and, at the same time, to obtain a finished product that is light in weight and of open porosity, either of the following procedures may be carried out, to-wit: Into the mortar with the clay, there is put directly the fine pre-dry-ground wood (or sawdust); and, after the other ingredients (sugar, water, calcium sulphate) mentioned in the illustrative example just given have been added to the sawdust and clay, the wet-grinding of the mass is proceeded with until dispersion thereof to submicroscopic dimensions is effected and the desired colloid state is attained. Or, else, the whole-wood substance may be pre-wetground and reduced to so-called "mechanical process" wood-pulp, after which the clay and the other mentioned ingredients are added and the entire mass is subjected to further wet-grinding until it is dispersed to the desired colloid state or form. Instead of adding sugar or other water-soluble organic substance, there may be added to the admixture a quantity of sulphuric acid of sufficient amount and strength so that this acid, by its direct action on the wood substance (aided by the catalytic action of the finely dispersed clay, which permits the action to be carried out in the cold), will form and produce enough sugar and other water-soluble organic matter to make possible, in a cheap and very effective manner, the accomplishment of the same ultimate results as were obtained, in the first illustrative example. For this purpose, sulphuric acid of specific gravity 1.82 may be used diluted in the ratio of two (2) parts of water to one (1) part of acid so as to prevent (by this dilution) any detrimental action of the acid on the organic matter. The quantity of strong sulphuric acid may be approximately twenty per cent. (20%) of the aggregate weight of the kaolin and wood substance. For the method that has just been described, there may be used practically any kind of wood or plant material; but, on account of the considerable amount of readily-extractable and highly-desirable tannin-nature substances that they contain and that constitute peptizing principle, oak and hemlock woods are especially suited for use; as, too, are pine and other coniferous woods, on account of the relatively large quantities of available resinous matters therein contained.

When admixture of pulp (or like cellulose) for the purpose of giving greater porosity of ultimate product is not desired, but it is sought to obtain a dense, strong and durable product, while yet making use of wood or plant material for organic-phase raw-materials, the wood or plant substance is subjected to prolonged digestion with water (either cold or hot), or else it may be more quickly treated with acid solution; in either of these ways, the water and/or desirable chemically-soluble constituents of the wood or plant material may be extracted and obtained therefrom and the cellulose part thereof may be discarded, whereupon this liquid-soluble organic-phase raw-material is mixed with the clay and the process is carried out as before described.

In the illustrative example hereinbefore given, substantially pure kaolin was used as the mineral-phase raw-material; and, since this raw clay contains none of the essential elements or salts for forming the necessary pectizing (and mordanting) principle, calcium sulphate (for example) was, in that case, added to serve as such.

It is practicable, of course, to add, to the clay, such elements or salts as will, with the addition of an acid, form the necessary pectizing and mordanting agent (or agents); and, as such acid, it is preferred to use sulphuric acid, although other acids (e. g., hydrochloric acid, acetic acid) will function, but not nearly as efficiently as does sulphuric acid. Some clays do, however, contain the elements or salts requisite for the formation of pectizing and mordanting agents; and, with such a clay, there is needed only the addition of acid or other like principle to convert such elements or salts to suitable form to act as such agents. Provided it be found practicable to allow the fine clay and sugar to stand for a time (say, from a few days to a week or even two weeks,—the period will depend on concomitant temperatures and on the degree of fineness of the clay), such conversion of the metallic elements or mineral salts may be accomplished by the action thereon of the acetic and other organic acids and aldehydes, etc., which are naturally generative in sugar solutions under the conditions obtaining and appearing to be intensified by the catalytic action of the fine clay in contact with the sugar; and the pectizing and mordanting agents that result from such action will function more or less effectively but they are not nearly as powerful and efficient as the ones produced from sulphuric acid. Furthermore, it may be observed that it is not ordinarily practicable to permit the mixture to stand for the period of time required and just set forth. Where the raw clay contains sufficient amounts of alkaline-earth metals (calcium preferred), or enough of aluminum, in such form as to be acted upon by weak acid-solution, it is then only necessary to add sufficient sulphuric acid to form therewith the essential pectizing and mordanting salts; ordinarily, from two per cent. to five per cent. (2%–5%) of the weight of the earth will prove a sufficient proportion of sulphuric acid, and this acid should be added after the water has been added to the other ingredients in order that the acid may come into contact therewith in dilute form. If the raw clay naturally contains iron and sulphur compounds (e. g., finely-divided iron disulphide or pyrites) which, in the prolonged fine grinding, will oxidize to sulphate form and give up free sulphuric acid, it may not be necessary to add sulphuric acid; and, similarly, it may not be necessary to add sulphuric acid, in case the raw clay used naturally contains appreciable amounts of acid sulphates derived from original natural decomposition in the ground and adapted to serve as pectizing and mordanting agents. When the raw clays just described are used as mineral-phase raw-material, there may be, at the conclusion of the heat-treatment step, in the product resulting therefrom, calcium sulphate and associated alums in excess of the amount required as pectizing and mordanting agents. But, just as excess alkali, from that used in manufacture, in zeolites, is water-soluble and completely removable by lixiviation down to that specific definite amount of alkali which is chemically and/or physically combined and so is a constituent essential part of the zeolite substance and which is not soluble or removable from the zeolite substance in contact with pure water, likewise are the excess calcium sulphate and associated alums removable by simple lixiviation with water down to the definite amount which remains in chemical and/or physical combination with the composite mineral-and-organic product. Therefore, as a step in the manufacture which follows the heat-treatment hereinbefore-described, the products resulting therefrom are lixiviated or percolated with water for the purpose of removing these excess pectizing and mordanting agents, whereby added porosity is given to the product.

By using varying proportions and admixtures of different clays of different natural densities (or weights per cubic unit), the density and corresponding open porosity and liquid penetrableness of the finished products may, within quite wide limits, be varied; and these ends may be accomplished without detracting from the non-water-disintegrative properties of the finished products and without appreciably detracting from their chemical and/or physical functioning properties and capacities.

Certain acids (e. g., sulphuric acid, which is preferred, and hydrochloric acid) act upon clay in such manner as to disperse it, for an instant to a colloid-sol form of matter, when they are used in proper strength and quantity; and this is true even though the end or visible result or effect of the acid treatment upon the clay is a colloid gel. This clay-dispersing action is a very valuable essential factor in certain methods of practising this invention. For example, in the illustrative method hereinbefore given, there is to be used enough water to permit of the proper physical dispersion of the clay by the mechanical action of the wet-grinding media alone and to make of the wet-ground material a thin cream, at the end of the grinding; and the hydrogel that results from the action of the submicroscopic particles of the water-dispersed constituents of the admixture upon one another is to be filter-pressed off. But it is practicable to proceed by using just enough liquid so that the clay and organic matter, after being ground together for a time, is still in a more or less stiff condition but yet is somewhat plastic; and, in order to compensate for the less effective physical action of the grinding media, there is included in the admixture, a sufficient quantity of acid (preferably sulphuric acid) so as to aid in the thorough and proper subdivision and dispersion of the clay to the desired colloid state,—a result that is effected by the chemical action of the acid, aided by such physical action as does result from the wet-grinding media. Then, instead of filter-pressing, the plastic mass is kneaded and subjected to moderate compression by suitable mechanical means, after which the pressed mass is subjected to predrying and heat-treatment in the manner hereinbefore described in connection with the illustrative example first given. At the conclusion of the predrying, this product contains considerably more excess acid than do the others the preparation of which has been hereinbefore described; but, if the predrying is properly carried out (as may quite easily be done), this excess acid is, during the subsequent heat-treatment, decomposed and dissipated by the chemical actions that take place in the product as a result of the heat applied; and the last of it is decomposed and volatilized off by the decomposing action of the carbon formed in the course of the heat-treatment, at the conclusion of which the product will be found to be neutral to litmus and other free-acid indicators. After heat-treating the material, it may be sized and lixiviated to remove excess calcium sulphate and then finished by blowing out excess water and drying the granules. For this method, the following raw materials may be used in the amounts named, to-wit: Of kaolin, one (1) pound; of air-dried paper-pulp, about twenty-five per cent. (25%) of the weight of the kaolin used; of calcium sulphate, between three and four per cent. (3%–4%) of the weight of the kaolin used; and of strong sulphuric acid, (that is, sulphuric acid of specific gravity 1.82 or, approximately, 92%-strength), about twenty-five per cent. (25%) of the weight of the kaolin used or twenty per cent. (20%) of the aggregate weight of the kaolin and pulp used, this acid to be diluted with water in the ratio of two (2) parts of water to one (1) part of the strong acid, in order to prevent detrimental action of the acid on the organic matter (pulp). All these raw materials are put in the mortar together and wet-ground, sufficient water being added to the mixture, from time to time, so that at the end of, say, five (5) hours of wet-grinding, the mass will be found to have attained the degree of plasticity just described. By the action of the acid upon the organic material (pulp), sufficient sugar will be produced to serve as water-soluble organic matter.

Another way of practising this invention may be briefly set forth as follows: The clay is first dispersed to the desired colloid-sol state but in a larger ratio of water than was used in the processing just described; and, in order to obtain maximum results, a small amount of peptizing principle in the form of some stabilizer (e. g., tannin, ammonium, sodium silicate) is added to the clay-in-water dispersion for the purpose of holding the dispersed clay in peptized sol form; this slight amount of stabilizer may be, say, from one tenth of one per cent. to one per cent. (0.1%–1%) of the weight of the clay used. When a sufficient proportion of the clay has thus been dispersed, there is added to the admixture, with constant stirring, the water-dispersed organic-phase raw-material; the relative amount (or proportion) of the latter is predetermined and will depend upon the particular product that is to be produced. To this thoroughly-stirred admixture, there is immediately added, also with constant, thorough stirring, the dilute sulphuric acid, which forms, with the appropriate element in the clay, the electrolyte or pectizing salt with which to cause the composite mineral-and-organic hydrosol to assume the hydrogel form and settle down; this pectizing salt serves also as mordanting principle in the finished product. After subsidence of the hydrogel, the clear supernatant liquid is decanted off, and the hydrogel is stirred and filtered (either by gravity or filter-pressed). Depending on the degree of density and the hardness that is desired for the ultimate product, the filter-cake may (or may not) be subjected to moderate pressing; after which the filter-cake is predried, heat-treated, and finished, as has hereinbefore been described in connection with the illustrative example first given. The decanted clear liquid or, as the case may be, the clear filtrate (or mother liquor) may, within certain limits, again be used for subsequent processing of fresh raw materials. For this processing, the following raw materials may be used in the amounts named, to-wit: Of fuller's earth of the kind obtainable in Bexar County, State of Texas, and known as "Medina" fuller's earth and containing from, say, four per cent. to eight per cent. (4%–8%) of calcium carbonate, one pound; of tannin, one per cent. (1%) of the weight of the "Medina" fuller's earth; and five pounds (5 lbs.) of water. These substances are ground together for, say, about fifteen (15) hours, in a mortar. Sugar, in amount about twenty per cent. (20%) of the weight of the fuller's earth is completely dissolved in about ten (10) times its weight of water (or, say, one fifth of a pound (⅕ lb.)

of sugar in about two pounds (2 lbs.) of water); and this sugar solution is added, with constant and thorough stirring of the mixture, to the colloidal fuller's earth dispersion in water, obtained as just described. The sugar serves as organic-phase raw-material in the processing now under consideration. To the mixture of the molecularly-dispersed sugar and the colloidally-dispersed earth, there is added an acid solution obtained by adding to three pounds (3 lbs.) of water, sulphuric acid of specific gravity 1.82 in an amount equal to twenty-five per cent. (25%) of the weight of the earth, that is, one fourth of a pound (¼ lb.). The dilute acid acts upon the lime carbonate in the clay to form calcium sulphate, which serves as pectizing principle in the mixture and as mordanting principle in the ultimate product.

All mechanical and physical media and methods for dispersing the clay to the desired colloid-sol state may, however, be wholly dispensed with; and the dispersion of the clay and its ultra-subdivision to ultra-minute colloid-sol state in which it can chemically and/or physically combine with the organic-phase raw-material dispersed to submicroscopic dimensions, may be brought about through entirely chemical action e. g., acid action; but this can be efficiently carried out only when fuller's earth of the nature of Florida fuller's earth is used as the earth or clay. In this mode of treatment thereof, use is made of a still greater excess of sulphuric acid than was used in any of the methods set forth in the foregoing. This greater quantity of acid may be added simply to semi-concentrated waste sulphite-liquor (or other dispersed organic substances), a little of the acid at a time being added in dilute form, or else in a small stream and with constant stirring, so as to avoid concentration of the stronger acid at any one point and thereby causing detrimental action on the dispersed organic substance. There is thus provided a liquid treating-mixture. In carrying out this process, clay of the nature of Florida fuller's earth is first dried and then prepared in granular form of the same mesh sizes and range of sizes as are intended for use in connection with the finished product (say, sixteen to thirty meshes and thirty to sixty meshes); and trays are partially filled with this granular earth. Onto the granular earth in the trays, the liquid treating-mixture consisting of dispersed organic substance and acid is flowed in concentration and volume that are predetermined. The voidage of the granular mass (that is, the interstitial spaces among the granules) permits of the immediate and uniform flowing of the liquid treating-mixtures throughout the entire mass and so permits each granule to be subjected to its individual and definite quota of the liquid treating-mixture. The volume of the liquid treating-mixture as predetermined is such that there will be just the amount of liquid that the earth is capable of taking up into its cellular structure; and the concentration of the liquid treating mixture is predetermined in such fashion that the amounts of total solids of organic substances and of sulphuric acid in the volume of liquid for each tray will be such as to provide the correct amounts or proportions of organic-phase raw-material and of acid for combining with the earth, with no excess of liquid left over after the earth-granules have been saturated with the liquid treating-mixture to their maximum absorbing capacity. At first, there will appear to be an excess of liquid; but, in just a few minutes, all the liquid is taken up into the cellular structure of the earth or clay. During the saturation of the clay and its absorbing action, the clay-granules and the mass thereof increase in volume; and, at the conclusion of the absorption of the liquid, this increase in volume of the clay-granules and the mass thereof amounts to approximately from fifteen per cent to twenty per cent (15% to 20%) over their original volume. This swelling-up is due to the chemical dispersing action, exerted on the clay by the acid and to the molecular mingling and combining of the mineral and organic components of the admixture (i. e. the admixture of the clay with the liquid treating-mixture). But while the individual granules of the composite substances are somewhat enlarged in size, their original shapes are not noticeably changed; and the granules themselves (or the mechanical structures thereof) are not appreciably disrupted. On subsequent pre-drying and heat-treating, the granules are physically compacted and shrink back to their original sizes, or to even a little smaller sizes. Inasmuch as the total solids of the treating liquid have been mingled and combined with the original constituents of the clay, the finished composite-substance granules are, therefore, substantially more dense and heavy per cubic unit than the original clay-granules; and they possess substantially greater hardness and are very satisfactorily resistant to crushing and crumbling forces and so are durable for repeated re-usings; moreover, they are equally as non-water-disintegrative as are the products of the preceding methods and they are very satisfactory in their chemical and/or physical functioning efficiencies and capacities in use. However, as mineral-phase raw-material, use may be made of clay-granules that are in an air-dried condition; or, again, use may be made of clay granules that have been artificially dried at moderate temperatures, say, three hundred degrees Fahrenheit to four hundred degrees Fahrenheit (300° F.–400° F.), and then allowed to stand until they have re-absorbed some of their original physical water. Such granules will more quickly take up the liquid mixture applied, the chemical and/or physical reactions will be more complete, and the ultimate product will possess somewhat greater chemical and/or physical functioning properties and capacities. But the ultimate product made according to this process will, while possessing full non-water-disintegrative properties, be less dense and hard, and its granules will be less resistant to crushing and breaking-down forces. If the raw clay-granules be subjected to heat sufficient to drive off most of the physical water and some of the chemically-combined water and thus physically to compact their structures, making use of temperatures of, say, four hundred and fifty degrees Fahrenheit to six hundred degrees Fahrenheit (450° F.–600° F.), and the liquid treating-mixture be added while the granules are still hot, such granules will somewhat more slowly take up the liquid mixture, the chemical and/or physical reactions and combinations will be somewhat less complete, and the chemical and/or physical activities of the finished product will be not quite as great; but the density, weight and hardness, and the resistance of the ultimate granules to crushing and breaking-down forces, will be quite materially increased. The reason for this is that, in the case of Florida fuller's earth (as is common, too, with many substances that possess latent colloid properties), on its once having its physical water removed by heat or pressure, the latent colloid phase thereof is largely converted to the so-called set-gel form of colloid matter, which form is either completely irreversible to the sol state or, at any rate, is, with great difficulty, reverted thereto. So, when the Florida fuller's earth is, before the addition of the liquid treating-mixture, preheated to the temperatures just mentioned, a corresponding percentage of its latent colloid-sol matter is thus affected and is not dispersed to the sol state by the chemical treatment applied. In fact, even air-drying causes a minor amount of the latent colloid-sol matter to undergo change to the set-gel state; and, therefore, the maximum degree of chemical and/or physical efficiency of the ultimate product is obtained only when the clay that is started with is taken fresh from the ground and is allowed to retain and possess all its original physical water at the commencement of processing. But these deficiencies occasioned by air-drying or artificially drying the earth at moderate temperatures are relatively so slight that factors of greater simplicity and economy in the handling of the dried clay in practical operation more than offset such deficiencies. For processing according to the foregoing illustrative method, the skilled worker will supply himself with enough raw Florida fuller's earth having a weight of thirty-five pounds (35 lbs.) per cubic foot, so that, after making proper allowance for loss in the form of undersize material produced by granulation, he will have five hundred grams (500 gm.) of the raw earth in granules at the end of the granulating step. This clay is broken into granules having a size of sixteen to thirty (16–30) mesh and is then put into a tray. He next prepares six hundred cubic centimeters (600 cc.) of a liquid treating-mixture by mixing three hundred cubic centimeters (300 cc.) of dilute sulphuric acid with the same volume of concentrated waste sulphite liquor of the kind hereinbefore described. The concentrated waste sulphite liquor is of a concentration of thirty-one to thirty-two degrees Baumé, and consists, at this degree of concentration, of fifty per cent (50%) solids. The dilute sulphuric acid is prepared by mixing fifty cubic centimeters (50 cc.) of acid of specific gravity 1.82 with two hundred and fifty cubic centimeters (250 cc.) of water. The clay-granules are treated with the mixture of concentrated waste sulphite liquor and this dilute acid, after which they are predried, heat-treated, washed and finished, as hereinbefore described. It may be here remarked that there is, during heat-treatment, much less danger of detrimental oxidation of the organic matter, when waste sulphite liquor is used, than is the case when straight wood products are employed, as in the illustrative example first given. The organic matter in the waste sulphite liquor is so thoroughly impregnated with non-oxidizable and non-combustive salts and matter also dispersed therein that they appear to exert a marked protecting influence against detrimental oxidation or combustion of the organic components, while undergoing the heat-treatment.

The granular methods just described afford two outstanding advantages, namely: First, there is no mechanical grinding or granulating of the material required after coming from the heat-treating step. After being heat-treated, the product may be dumped directly onto screens; and the agitation occasioned by screening will be found generally sufficient to disunite any slight cohesion and sticking together of the heat-treated granules, which are readily screened and graded to the desired mesh sizes. In this instance, the screening operation has for its purpose only the removal of whatever fine dust has accumulated from mechanical attrition during the predrying and heat-treating steps; and the percentage amount of this fine dust is negligible. If the processing is properly carried out, and while considerable swelling of the original granules at the time of application of the liquid treating-mixture is entailed, the swollen granules subsequently shrink back to their original dimensions and separate individual forms sufficiently so that, on conclusion of the predrying, there is very little cohesion of the granules among themselves and, on conclusion of the heat-treating, practically none; second, because no mechanical grinding and granulating are required, there is no consequential amount of smaller-mesh granules formed that would be too small for suitable filtering use of the finished product. Such undersize material, while finding a market in various minor industries, for use therein by the contact method of use, would, perhaps, command a lower market value for such minor uses. When the product is produced in massive or lump form and the grinding and granulating thereof to desired size are done between the predrying and heat-treating steps, there are entailed the additional labor and cost of returning the undersize portion to the clay-dispersing step of the process, there to be admixed and reprocessed with fresh raw materials; for, it has been ascertained that the material may with success be reprocessed up to the conclusion of the predrying step, provided the predrying temperatures are not allowed to run too high. If the material be heated too high, it will completely assume the set-gel form, and it then cannot feasibly be redispersed and reprocessed; and, for the same reasons, the material cannot be reprocessed after it has been subjected to heat-treating temperatures. As has hereinbefore been stated, these granular methods can be efficiently carried out only when Florida fuller's earth is used as the mineral-phase raw-material. The exceptional cellular structure of this earth and its exceptionally high capacity for immediately taking up liquid, as has hereinbefore been defined, is, in the first place, what makes this simple procedure possible. A second reason is that Florida fuller's earth is capable not only of automatically taking up a sufficient amount of liquid to carry into itself a sufficient amount or proportion of liquid-dispersed (e. g., water-dispersed) organic-phase raw-material but it can do so ( as also has been hereinbefore pointed out) without having its cellular and mechanical structure physically decomposed, disintegrated and broken down to mud, unless it is subjected to pressure under unconfined conditions. A third reason is, as has also been alluded to in the foregoing, that the latent colloid-sol phase of this earth (which phase was evidently inherited from its original colloid form at the time of its formation and consolidation in nature and of which phase its cellular and mechanical structure is largely composed), is so ultraminute virtually constituting submicroscopic dimensions (in quite large part at least), that when the stronger sulphuric acid that carries with it in molecular intimacy the dispersed organic-phase raw-material, permeates throughout the cellular structure of this Florida fuller's earth, the acid mixture then in turn is brought into sufficient ultra-proximity with the latent colloid-sol phase composing the cell walls so as to permit of its powerful chemical action quickly dispersing the mineral substance to desired colloid-sol form; and the dispersed organic substance being instantaneously present and available for action, the conditions are such as to allow this organic substance to combine quickly with the mineral sol matter; and, again, for similar reasons, the pectizing salts being also instantaneously formed and made available, the composite sol combination or mutual solution is instantly converted to gel form. Thus the complete cycle of dispersion, reactions, combinations and formations is rendered as complete and effective as though the dispersion had been carried out in whole or in part by mechanical and physical means. But, if this method of procedure is undertaken with other than Florida fuller's earth (that is, earths that are more dense and impenetrable to liquid and that have less automatic liquid-absorbing capacities and that do not possess the exceptional latent colloid-sol phase hereinbefore mentioned), one or the other of the following things will happen, viz: Either the clay granules, if they are of the impenetrable type, will successfully resist the penetration of the liquid treating-mixture, whereby only the outer surfaces of the granules will be affected by the liquid treatment applied and that, too, only imperfectly. Or else the clay granules, if they are of the penetrable type, will be quickly decomposed, disintegrated and broken down to mud by the liquid treating-mixture applied; and the operation will result in only a pasty, homogenous mass, which, on drying, will have practically no resemblance to granular form but which will dry to either a powdery, friable mass, or a hard cake, depending on the other physical characteristics of the earth used; moreover, even if the earth be of the physical type which will dry to a hard cake and which might otherwise be granulated by mechanical means and then used, its efficiency, as a finished product, would not be sufficient to give it commercial value for the following reasons, namely: First, its relatively low capacity for taking up the treating-liquid would not permit of sufficient amount of organic-phase material being in that way combined with it; and, second, the much less amount of naturally latent colloid-sol matter of ultraminute subdivision would not permit of sufficient and complete enough dispersion, reactions, combinations and formations to give the finished product a worthwhile degree of efficiency. And those clays which dry to friable form would not, for like reasons, be efficient enough to make them worth while for use in the contact method of use. Therefore, in dealing with these other earths (earths other than Florida fuller's earth), it is necessary first to disperse them to desired sol (e. g., hydrosol) form by separate mechanical and physical means. It may be remarked, in connection with the description of the granular methods hereinbefore detailed, that somewhat improved all-around ultimate results are obtained by adding the sulphuric acid to the concentrated sulphite liquor in sufficiently strong form to precipitate out some of the calcium therein before adding to the liquid mixture to the granules; the precipitated calcium is discarded.

Hereinafter is set forth a method in which an undersize or fine mesh clay product (that is, 100-mesh, and even finer mesh, rotary-kiln-dried Florida fuller's earth) is used as the mineral-phase raw-material. In carrying out this process, use is made of the stronger and higher-percentage of excess sulphuric acid with which a large part of the dispersion of the clay is chemically performed, whereby a minimum and cheap amount of mechanical and physical manipulation of the clay is made permissible; the weight of acid used is about ten per cent. (10%), approximately, of the total weight of the raw materials. It has been ascertained that, where use can be made of the cheaper commercial acids and the less-expensive lower-strength acids, excess acid for in large part chemically dispersing the clay is much cheaper and the process is much more simply carried out, both from the standpoints of first costs of installation and of regular production costs thereafter, than it would be to install and operate mechanical and physical apparatus with which to disperse the clay to essential colloid-sol form mechanically and physically; and a greater strength than 25%-strength is not absolutely required in the acid. Furthermore, it may be preferred, in carrying out this process, to use the waste sulphite liquor of the form as concentrated to between thirty-one degrees and thirty-two degrees Baumé, that is, to a basis of fifty per cent. (50%) total solids; for example, one hundred pounds (100 lbs.) of the concentrated liquor, when evaporated to dryness at around the boiling point of water, would furnish fifty pounds (50 lbs.) of organic matter and calcium salts of the relative proportions that have hereinbefore been designated. This degree of concentration permits of the requisite amount of sulphuric acid being added to the liquor in sufficient dilution in water to avoid detrimental action of the acid on the organic material and, at the same time, to furnish just such a total volume of liquid treating-mixture as will make possible the correct amount and proportion of organic matter to be carried to the clay and also to permit the water-content of the liquid treating mixture to be sufficient to enable the chemical and/or physical reactions to be made complete. The total volume of the liquid treating mixture is to be sufficient to penetrate to and to saturate thoroughly all the clay; and there is to be just sufficient total volume of the liquid treating mixture so that there will not be any excess or free liquid to cause the resulting composite mass to be too thin for proper subsequent working conditions. The proportions of dry-basis organic solids in the liquor to be used for combining with the clay, will run all the way from a ratio of one pound (1 lb.) of organic solids to two and one-half pounds (2½ lbs.), or even less, of clay, to a ratio of one pound (1 lb.) of organic solids to six pounds (6 lbs.), or even more, of clay, depending on the particular nature and quality of the ultimate product desired and being produced. From this it follows that the amount or proportion of water, and, to some extent, that of sulphuric acid, in the liquid treating-mixture will be made to vary accordingly. With Florida fuller's earth of the fineness hereinbefore mentioned in a suitable receptacle, a predetermined correct amount of the liquid treating-mixture will be used with which to saturate the clay. The composite mass will then be thoroughly stirred and mixed by suitable mechanical means in such fashion as to ensure thorough and uniform mingling of the total ingredients. This mingled, and chemically and/or physically combined, composite homogeneous mass, which is more or less plastic in consistency, will then, by appropriate mechanical means, be moderately pressed and compacted and molded into such form as will be best suited for efficient handling and pre-drying. The degree of pressing and compacting of the plastic, homogeneous mass will vary and will depend on the degree of hardness and the degree of resistance to crushing and mechanically breaking-down forces that are desired in the ultimate granular form of the material. It is practicable, within quite wide limits, thus to vary the granular density and hardness, the resistance to crushing forces and the corresponding mechanical durability of the finished granular products. As an illustrative example of processing with Florida fuller's earth fines (or undersize material), to which reference has hereinbefore been made, the following is given for the information of the skilled worker in the art, to-wit: In a mixing-box or trough, mix ten and one-half gallons (10½ gals.) of water with three gallons (3 gals.) of sulphuric acid of specific gravity 1.82. To this dilute sulphuric acid, there is added, a little at a time and with constant stirring, twelve gallons (12 gals.) of waste sulphite liquor of a concentration of nineteen to twenty (19-20) degrees, Baumé, which here corresponds to thirty-five per cent. (35%) solids; the addition of the waste sulphite liquor to the acid solution being made gradually so that, by the exercise of abundant caution, the comparatively strong acid will not detrimentally affect the organic-phase raw-material. Into this liquid treating mixture, there is poured a quantity of Florida fuller's earth fines weighing about one hundred and twenty-five pounds (125 lbs.); these fines are of, say, from 100-mesh size down to much smaller size (even to the size of particles of dust or impalpable powder). The pouring of the fines is accompanied by constant, thorough stirring to ensure thorough mixing of the fines with the acidified waste sulphite liquor. Of these fines, to ensure best results and particularly that the material will not be thin and sticky when it is extruded in the processing (hereinafter described), about twenty per cent. (20%) or about twenty-five pounds (25 lbs.) may be of predried (but not heat-treated) undersize material gotten as a by-product during the granulation of preceding batches manufactured according to this same method of processing, the step of granulating being effected between the predrying step and the heat-treating step; but the percentage of fines used will vary with the conditions of operation and should, in any case, be sufficient in amount to bring about a proper consistency of the mass under treatment, for the particular conditions that then obtain. It is for the purpose of ensuring complete transformation of the fines into hydrosol form that such a high proportion of sulphuric acid is used. By constant, thorough agitation of the composite mass it is brought to a high degree of homogeneity and becomes smooth and plastic. In this condition, the material is pressed and compacted; and it may then be extruded from the press into molds of suitable shape (e. g., brick form; hollow-tile form). In the use of a filtering, decolorizing and impurity-removing medium of granular form, it is highly desirable that the granules be of sufficient open porosity to permit of the ready penetration of the liquid under treatment to the interiors of the granules. Granules that are so dense as not permit of such ready penetration of the liquid that is being treated, either have their functioning capacities too greatly cut down, in that their functioning is limited to their surfaces; or else, if the operation is conducted slowly enough to permit the interiors of the granules to function, the rate of operation is too slow to be practicable. On the other hand, that there actually exists excess open porosity, or excess openness of structure, depends considerably upon the consistency or viscosity of the liquid that is being treated; for instance, a petroleum lubricating-oil naturally requires a more open structure than a liquid of lower viscosity, such as a raw-sugar liquor. The pressing and compacting step may, however, be omitted from the processing; and, in case it is, the resultant product would be best suited for maximum functioning capacities on thick heavy liquids; but the granules of this product would be quite easily crumbled. For lighter liquids (such as raw-sugar liquors), a more dense granular structure functions even more efficiently than do too open structures; therefore, for such uses, it is preferred to press and substantially to compact the material before drying it; and it has been proven, by actual test, that the ultimate granules from such pressed and compacted material are very hard and brittle (but neither friable nor fragile) and possess great durability. These features are especially important in connection with sugar-refining uses, for the reason that the filtering chars used in sugar-refining are expected to be reused many more times than are the granular fuller's earth used for petroleum-oil filtering. The natural open structure of Florida fuller's earth, which renders it peculiarly appropriate for heavy-petroleum oil-filtering, is readily "telescoped" (as I term the effect of the pressing and compacting of the composite plastic and homogeneous hydrogel material); and the substance is rendered substantially more compact and dense on subjection to moderate pressure, if that pressure be applied when the material is in the hydrogel form or state that results from the chemical and/or physical reactions and combinations of the processes that have been hereinbefore detailed; and, in that way, the ultimate granular product is rendered very hard, brittle (but neither friable nor fragile) and durable. Granules of bone-black char, a natural or semi-natural product, possess a degree of density of structure that causes them to be much less efficient for heavy-petroleum oil-filtering than is Florida fuller's earth, unless the rate of filtration is allowed to be so slow as to be altogether impracticable; moreover, this excessive degree of density of boneblack granules is such as to cause them to be very slow in their action even on lighter liquids (such as sugar-liquors in raw-sugar refining). Obviously, if the rate of filtration is speeded up, as it is a particularly desirable thing to do in sugar-refining because of the very unstable nature of sugar-solutions before they have reached their final stage of refined purity and crystallization, the functioning capacity of a given weight of boneblack char would be very materially lessened. In view of the fact that there can be given to the products that result from practicing this invention, a hardness and mechanical durability fully as great and even greater than that of boneblack without, at the same time, decreasing the liquid penetrableness of such products to a point that would prevent their full functioning capacities at a rate of filtration much faster than is practicable for boneblack, this pressing and compacting step is considered to involve distinctive novelty and value. After the completion of this pressing and compacting step, the pressed and suitably-moulded material is predried and then heat-treated, dehydrated and charred in the usual manner that has hereinbefore been described.

The product obtained by the process just described in the foregoing is obtained, as predried, heat-treated and charred, in massive form; that is to say, in homogeneous, hard cakes or lumps, or in homogeneous molded form corresponding to the form of the mold in which it was pressed and molded (e. g., brick form; hollow-tile). So, the material must be next mechanically reduced and granulated to desired mesh-sizes. The undersize material derived from such granulation, may be utilized for other than granular-filtration methods of use (e. g., in the so-called contact method of decolorization and impurity removing). However, the material may be granulated between the predrying and the heat-treating steps, in which case the undersize material derived from the granulating step may be returned to the start of the processing and there admixed and reprocessed and worked up with fresh raw materials; and, when so admixed, the undersize material last mentioned serves to overcome any tendency of the material to acquire, at the pressing and compacting step, an undesirable thinness or stickiness, which action is promoted by a reduction in the amount of water used in the initial mixture.

In processing in which use is made of Florida fuller's earth fines, the sulphuric acid may be added to the sulphite liquor and then this liquid treating-mixture may be added to the clay. As a result of this procedure, and further as a result of the clay appearing to have a selective action and to take up more completely some of the lighter fractions and more soluble constituents of the liquid treating-mixture first, there is a tendency on the part of some of the calcium salts to precipitate out in free form before they have had opportunity to come into intimate contact and combination with the other constituents, whereby the finished product is caused to be slightly mechanically admixed with free calcium salts which, to some minor extent, depreciate both the hardness and brittleness and the chemical and/or physical activities of the finished product, and, to some extent, prolong the lixiviation and washing of the material before its use. However, if these slightly adverse conditions and ultimate effects prove to be of sufficient degree to warrant the additional operating bother and costs, they may be fully eliminated by proceeding in the following way: To the clay, there is added the straight sulphite liquor in a degree of concentration in which the liquor carries twenty-five per cent. (25%) of total solids, whereby the full quota of calcium salts are allowed to come into intimate contact with the cellular walls of the clay and with the organic constituents. There are then added the requisite amounts of sulphuric acid and water in solution, whereupon the chemical and/or physical reactions and combinations are complete and include the full quota of calcium salts. This procedure results in an improved quality of ultimate product.

After the material has been mechanically reduced and granulated to desired mesh-sizes, the granules so obtained are then lixiviated and washed with water to leach out the excess mordanting-salts. The preferred way of doing this is to place the granular material in a large tank or container having an inlet at its top for fresh water and an outlet at its bottom for the wash water. The downward flow of water is preferred; because, in that way, taking advantage of the laws of diffusion of dissolved salts, the heavier salts and heavier solutions of salts diffusing downward, and the lighter salts and lighter solutions of salts diffusing superincumbent to the heavier, it is practicable to maintain the wash effluent at practically complete saturation point until the leaching is practically completed; thus, the leaching is accomplished with a minimum amount of water. Further, to accomplish the leaching in as short a space of time as practicable, together with the use of a minimum amount of water, it is desirable to have the rate of flow of the wash-water quite rapid at the start, while the outer parts of the granules are more quickly being leached, whereby a saturated effluent is obtained at the faster rate of flow; and then, when the more slowly-leaching interiors of the granules are being leached, the rate of flow is gradually slowed, in order that the wash effluent may be maintained at saturation. Aside from the economy factor involved, it is desirable to use a minimum amount of water for leaching and washing for the following reason: If an excess of wash-water is used and the water-supply contains dissolved salts, these dissolved salts tend to depreciate the ultimate efficiency of the products, particularly if an amount of water is used much in excess of that actually required for the removal of the excess mordanting salts. Naturally distilled water is preferable for leaching and washing; but it is hardly practicable for large-scale production. The leaching and washing may be carried out with either hot or cold water. With the particular mixture and kinds of salts to be removed, hot water would be somewhat more rapid and effective in its action; but the advantages of its use would hardly compensate for the cost of heating the water for that purpose alone. However, the material, if of granular form and otherwise ready for use as it comes from the heat-treating oven, may, with advantage, be directly quenched in cold water; and thereby there is not only provided a cheap way of heating water for lixiviation purposes but it is also made possible to dispense with a cooling-bin (or room) for the hot material, the advantage of which is obvious. The material should be lixiviated and washed until the wash-effluent no longer shows much precipitate with barium chloride (thereby indicating that all of the soluble sulphates are down). By slightly acidulating the wash-water (for example, in the proportion of one part of sulphuric acid of specific gravity 1.82 to four thousand parts of water), possibly adverse effects of salts that may be present in the water are eliminated. Also, this acidulation of the wash-water results in the production of desirable chemical and physical conditions of the mordanting agent which result in very materially increasing the decolorizing efficiency and capacity of the ultimate product.

Following the leaching and washing step, the material, before removal from the tank, is preferably blown-out with air or steam in order to remove the bulk of the adhering water; then the material is emptied onto a belt conveyer and thereby taken to the place of redrying. The redrying of the washed material may be carried out at practically any temperatures that are consistent with minimum cost of redrying. A redrying temperature of one hundred degrees centigrade (100° C.) would be sufficient for best efficiency of the material in use; but higher temperatures than that would likely afford cheaper drying. However, care must be taken not to use such temperatures as would needlessly drive off the chemically and/or physically combined water that was taken up in the leaching step and thereby needlessly to depreciate both the weight and the efficiency of the material in subsequent use. Therefore, redrying temperatures that do not exceed four hundred degrees Fahrenheit to five hundred degrees Fahrenheit (400° F.—500° F.) are preferable. The weight of the finished material, after making allowance for any mechanical fines discarded and for such mechanical loss as may be occasioned throughout the processing, quite closely approximates the weight of the dry-basis solids of the raw materials started with. However, due to a large percentage of colloidal or physically-combined water that is retained at ordinary predrying temperatures, there is a loss in weight on the material between the predrying step and the heat-treating (charring) step, which loss ranges from around fifteen per cent. (15%) to as much as thirty per cent. (30%), and even more, depending in part on the proportion of organic-phase raw-material that is used and on which there is loss in weight occasioned in the heat-treating step, by reason of the driving-off, during the latter, of gases and volatile matters other than water. Following the redrying consequent to the leaching and washing step, the material is then ready for use.

And this product may be used in all the various ways and in the same manner and in and with the same facilities for use, as are all the various materials for decolorizing and removing impurities from liquid solutions. For example, if used, in the granular form, for filtering sugar solutions, it may, when its functioning properties and capacities have become exhausted, be revivified and reused, by first thoroughly washing out the material in the filter with water (preferably hot water) and, in this way, removing all the extraneous matter accumulated from the raw-sugar liquor filtered through it; this washing removes everything except the coloring matter and other impurities which have been taken from the raw-sugar liquor and which are adsorbed, mordanted and combined or fixed and retained in the cellular structure of the material in such way that water-washing does not remove them. After thorough washing, the material is next emptied onto a conveyer or otherwise conveyed to a place of drying, where it is dried at moderate temperatures. After drying the material, it is, in a manner similar as in the process of manufacture, again subjected to heat-treatment sufficient thoroughly to oxidize and char the impurities retained from the raw-sugar solution. It is then again ready for use, in practically the same degree of efficiency as when used for the first time; and this cycle of revivifying and reusing may be carried out and repeated for an indefinite number of times. The greater part of the gradual depreciation of the material consists of mechanical breaking-down, by the ordinary wear and tear involved, to such fineness of mesh that it is no longer fitted for filtration use. Hence, the desirability and very consequential value, in manufacture, of producing as hard and durable a product as is possible,—one capable of withstanding such mechanical breaking-down action for as long a time as possible,—becomes plain. Further, in the case of this product, it is preferable that, in the heat-treatment step of the revivification and reusing cycle, the degree of heat used be not allowed to exceed materially the temperatures used in manufacture, namely, in the neighborhood of eight hundred degrees Fahrenheit (800° F.); and even somewhat lower temperatures than that would, in certain cases, suffice. Higher temperatures than the one specified are not prohibitive; but they tend, in degree as applied, to cut down more or less both the efficiency of the material and the speed of its efficiency; moreover, the use of such higher temperatures results in only an unnecessary waste of fuel. It may be remarked that boneblack, due to its more dense nature and to the evident adverse peculiarities of its calcium phosphate structure, requires somewhat higher temperatures for revivifying it and a somewhat longer time of subjection to the heat; and it has been the custom to heat boneblack to a dull-red to revivify it, which involves, therefore, greater revivifying costs as compared with the costs of revivifying the product made according to this invention. If the finished material is to be used for the decolorizing and purifying of oils, the technic of the operations and the cycle of using, revivifying and reusing, are practically the same as those described hereinbefore for use with sugar-solutions, with the exception that, instead of complete washing-out of extraneous matter accumulated with water, there are included solvents more appropriate for the removal of oily matters; for example, if the liquid to be treated is a petroleum oil, the cheapest and preferred solvent is gasoline or naphtha; if it be a vegetable oil or an animal oil, a solvent more appropriate thereto is employed; and, among such solvents, there may be named the following: ether, benzol, carbon disulphide, carbon tetrachloride, chloroform, alcohol, acetic ether, acetone, or various mixtures thereof. The matter of the solvents is important, for the reason that there are contemplated, for the products obtained by practicing this invention, new uses and methods of use that have not heretofore been feasibly and economically possible by reason of the liquid-decolorizing and impurity removing materials heretofore known not being thus applicable to such new uses and methods of use.

In practising this invention, care must be taken to guard against the corroding actions of the raw materials and mixtures thereof used; to this end, all mechanical equipment for carrying out the processes hereinbefore described should either be constructed of such substance (metal, alloy, wood) as will be suitably resistant to such corroding actions or have such parts of it as will in operation be exposed thereto protected therefrom. Such parts of the mechanical equipment as will in operation be subjected to abrasive action should be constructed of such material that the products of abrasion thereof will have no detrimental effect on the essential forms of colloid matter produced. Grinding media made of iron are not suitable because the products of their abrasion are chemically contaminating and detrimental to the matter under treatment. Grinding media made of glass are not suitable because their alkali-containing products of abrasion adversely affect the desired form of colloid matter to be obtained at the conclusion of the grinding. Grinding media should be used that are best adapted for producing the desired essential form of colloid matter and the products of abrasion of which are such as will not chemically contaminate the materials that are being subjected to treatment; and the grinding media used should be of such material as will give off a minimum amount of such products of abrasion as are likely detrimentally to affect the essential colloid state or form of the product. Porcelain balls may be used as grinding media for the reduction of the mineral-phase raw-material to the desired colloid-sol form; however, it is to be borne in mind that porcelain balls are expensive; and, for large-scale production, there would be large power-consumption on account of the power required for the continual moving of the load of balls; moreover, the space taken up by the balls greatly cuts down the capacity of the mill. Where clay of the nature of Florida fuller's earth is used as mineral-phase raw-material, the use of balls may be dispensed with due to the fact that such a clay requires only a moderate amount of force and of kneading and squeezing action thoroughly to disintegrate and disperse about ninety per cent. (90%) of its substance to a condition of fully adequate colloid-sol form, which, by pectization, becomes converted to the colloid-gel form. The raw lump-form of this kind of clay may be fed into the base of any suitable substantially horizontally-disposed cone-shaped revolving container; and the rolling, kneading, squeezing action of these lumps or coarse particles of raw earth one against the other, and as augmented by the weight of the superimposed layers of material and the weight of the liquid above the material, will result in the thorough and efficient reduction and dispersion of the clay to the desired colloid-sol form; and the material thus dispersed would be gradually lifted and floated to the outlet end of the cone-shaped container. Other types of clay cannot, however, be handled in this way; for, they require actual mechanical grinding to reduce and disperse them to the desired colloid-sol form.

In the use of certain types of mills for the dispersion of the clay in large-scale production, there are generated electrical forces which act as exceptionally effectual stabilizers in maintaining the clay in suspended sol form.

Apparatus may be employed in carrying out such of the methods hereinbefore described as do not involve the use of the larger ratios of water and mechanical and physical media for entirely or in large part dispersing the clay or other mineral-phase raw-material to essential colloid form, and afterwards filter-pressing the resultant hydrogel; as before set forth, in describing such methods, use was made of just enough water to bring the composite admixture of raw materials to a plastic mass and the chemical action of the stronger or excess acid was relied upon entirely or in large part for dispersing the clay to the desired colloid-sol state. In such methods, the function or operation of the mechanical apparatus is mainly to wet-mix, knead, compress, extrude and/or press into or through suitable molds or forms, the raw materials, and the composite plastic mass produced from them. Where the wet-mixed, kneaded and pressed mass is intended to be of no particular shape or molded form, rolls may be employed. Where, however, for simple economical handling up to and throughout the predrying step (and more particularly for very large scale production), the wet-mixed, kneaded and pressed material of plastic consistency is to be given a brick or hollow-tile form (or other pressure extruded or molded form), there may be employed an apparatus in the mode of operation of which four steps of the processing are combined into a single operation. These four steps are the following, namely: (a) Bringing the mineral-phase and the liquid organic-phase raw-materials and the acid together and mixing them; (b) further mixing, kneading and gradual compressing of the composite raw-material mass; (c) subjecting the resultant plastic mass to the degree of pressure desired; and (d) extruding the mass under pressure and/or forcing it into or through molds and thereby shaping it to the extruded or molded shape or form desired. Should the mass assume a consistency that is too thin and sticky for efficient working, predried (but not heat-treated) undersize material derived from the processing of previous lots or batches of material, may be admixed to overcome the difficulty.

As compared with boneblack and other decolorizing carbons (or chars) heretofore known, the new product obtained by practising this invention is produced at a much lower cost; moreover, it combines the efficiencies of fuller's earths and decolorizing carbons in one non-water-disintegrative product, and finds a much wider field of application, both in its granular and its finer-mesh forms. By reason of its being economically possible to supply the new product graded in closer and more uniform mesh-ranges, improved filtration, in granular-filtration uses, is obtained by its use. It possesses much improved liquid-decolorizing and/or impurity-removing capacities; and, in granular-filtration uses, it is much more rapid than are prior-art substances. Therefore, in raw-sugar refining, the new product is particularly advantageous. Liquids filtered therethrough are of much improved quality; and it gives much larger yields of colorless or near-colorless filtrates. The new product possesses improved durability for withstanding mechanical wear and depreciation in repeated reusings and more dependable uniformity of quality and efficiency, and dependably less degree of decrease of efficiency, between reusings. There are existent dependable and unlimited sources of supply of raw materials required in its manufacture; and the availability and supply of the manufactured article are dependable.

The new substance is adapted to uses, and may, with advantage, find employment for purposes other than the liquid-decolorizing and impurity-removing uses set forth somewhat at length in the foregoing; and, among such other fields of employment, there may be mentioned briefly the following, to-wit: (1) General insulating purposes, and, particularly, when or where insulating materials of a non-water-disintegrative character are desired or required. (2) Special electrical conductive uses, either in normal form or when treated and modified to conform thereto. (3) Gas-absorbing, gas-recovering, gas-purifying and gas-fractioning uses. (4) Rectification, purification and recovery of liquors and of rancid essential and volatile oils. (5) Liquid bacterial filtration and other germicide uses. (6) Fractionation of oils. (7) Separation, fractionation and recovery of vital plant and drug principles in pharmaceutical and medicinal practice and general pharmaceutical and medicinal uses. (8) Use in metallurgy. (9) Economical production of artist's oils. (10) Foundry core-oil correction uses. (11) Economical small and large space deodorizing and sterilizing uses. (12) Fertilizer uses.

The apparatus hereinbefore described is not claimed in this application; a separate application for patent thereon will be filed later and especially devoted thereto.

The invention hereinbefore disclosed is basic and pioneer; for, I am the first to have invented and to have disclosed how to bring about such an intimate union in the presence of peptizing principle of inorganic matter (e. g., clay) with organic matter (e. g., sugar, wood-pulp) as to produce a composite inorganic-and-organic sol (e. g., a hydrosol) the constituents of which are in a state of union of the nature of a mutual solution, and then how to obtain with suitable pectizing principle, from such a composite sol, a composite inorganic-and-organic colloid gel (e. g., a hydrogel) the constituents of which are in a like relation of mutual solution; I am also the first to have invented and to have disclosed how to convert such a colloid gel (e. g., a hydrogel) into a dehydrated gel that, in its structure, may be likened somewhat unto an alloy, that is to say, a substantially homogeneous solid colloid mutual solution of inorganic matter and carbon, by so heat-treating the colloid gel (e. g., hydrogel) as to cause dehydration thereof and to char or carbonize the organic component thereof. In accordance with the provisions of the patent statutes, I have herein described the best mode now known to me of carrying this invention into effect; but I desire it to be distinctly understood that I fully realize that changes may be made therein and that I intend to include within the scope of the claims that follow hereinafter all modifications that do not depart substantially from the spirit thereof. While clay having the nature of Florida fuller's earth seems to me to be the inorganic substance that is best adapted for dispersion to the sol state and, while therein, to enter into union with organic matter dispersed to submicroscopic dimensions, so as to produce, in the presence of a pectizing agent, a composite inorganic-and-organic hydrogel, yet other clays may be employed and so, too, may minerals (rocks) from which such clays are derived, as, for example, by decomposition. While I prefer to use as pectizing principle an agent that is also a mordant, where the ultimate product is to be used for decolorizing and impurity-removing purposes, yet separate substances may be employed and a pectizing agent that is not a mordant may be made to serve along with a mordant that is not a pectizing agent. Speaking generally, it will be found that the waste sulphite liquor hereinbefore particularly described contains sufficient pectizing agent (and pectizing mordant) and even an amount thereof that will afford an excess quantity the removal of which by the lixiviation or leaching hereinbefore described confers upon the ultimate product the aforementioned desirable porosity (that is, cellularity) that is in augmentation of the porosity which is brought about by the charring of the organic component of the inorganic-and-organic partially set colloid gel (e. g., a hydro-and-set gel) that results from the predrying of the inorganic-and-organic colloid gel (e. g., a hydrogel), and the escape of the gaseous products of such charring. However, should there prove to be any deficiency in the content of pectizing agent (or mordant) in the particular waste sulphite liquor employed, such deficiency may, as will be readily understood by all skilled in this art, be made good by the addition thereto of a suitable amount of any of the pectizing agents known to the art. While the aqueous solution of a colloid (otherwise termed a hydrosol) has hereinbefore been particularly mentioned, and while water affords an always available and cheap dispersion medium, yet dispersion mediums other than water may, without departing from the spirit of this invention, be used; and the same is true of the gels that are derived by the coagulation of the sols out from such dispersion mediums.

I claim:—

1. Preparation of a composite argillaceous-and-organic colloid gel from organic matter liquid-dispersed to submicroscopic dimensions and mingled with argillaceous matter similarly dispersed, in the presence of acid, and of pectizing principle that pectizes the mingled dispersed matter from the liquid dispersion phase in composite colloid gel form.

2. Preparation of a mordanted composite argillaceous-and-organic colloid gel from organic matter liquid-dispersed to submicroscopic dimensions and mingled with argillaceous matter similarly dispersed, in the presence of acid, and of a pectizing mordant that pectizes the mingled dispersed matter from the liquid dispersion phase in composite colloid gel form.

3. Preparation of a porous substantially non-water-disintegrative composite argillaceous-and-carbon set-gel from a composite argillaceous-and-organic colloid gel first obtained from organic matter liquid-dispersed to submicroscopic dimensions and mingled with argillaceous matter similarly dispersed, in the presence of acid, and of pectizing principle that pectizes the mingled dispersed matter from the liquid dispersion phase in composite colloid gel form; and then heating the gel so obtained to temperatures sufficiently high to cause dehydration of the gel and carbonization of the organic component thereof and yet low enough to avoid disruption of the gel structure.

4. Preparation of a porous substantially non-water-disintegrative composite argillaceous-and-carbon set-gel from a composite argillaceous-and-organic colloid gel first obtained from organic matter liquid-dispersed to submicroscopic dimensions and mingled with argillaceous matter similarly dispersed, in the presence of acid, and of pectizing principle that pectizes the mingled dispersed matter from the liquid dispersion phase in composite colloid gel form; compacting the gel so obtained; and then heating the compacted gel to temperatures sufficiently high to cause dehydration of the gel and carbonization of the organic component thereof and yet low enough to avoid disruption of the gel structure.

5. Preparation of a mordanted porous substantially non-water-disintegrative composite argillaceous-and-carbon set-gel from a composite argillaceous-and-organic colloid gel first obtained from organic matter liquid-dispersed to submicroscopic dimensions and mingled with argillaceous matter similarly dispersed, in the presence of acid, and of a pectizing mordant that pectizes the mingled dispersed matter from the liquid dispersion phase in composite gel form; and then heating the gel so obtained to temperatures sufficiently high to cause dehydration of the gel and carbonization of the organic component thereof and yet low enough to avoid disruption of the gel structure.

6. Preparation of a porous substantially non-water-disintegrative composite argillaceous-and-carbon set-gel from a composite argillaceous-and-organic colloid gel first obtained from organic matter liquid-dispersed to submicroscopic dimensions and mingled with argillaceous matter similarly dispersed, in the presence of pectizing principle that pectizes the mingled dispersed matter from the liquid dispersion phase in composite colloid gel form; heating the gel so obtained to temperatures sufficiently high to cause dehydration of the gel and carbonization of the organic component thereof and yet low enough to avoid disruption of the gel structure; and conferring cellularity on the gel by washing.

7. Preparation of a porous substantially non-water-disintegrative composite argillaceous-and-carbon set-gel from a composite argillaceous-and-organic colloid gel first obtained from organic matter liquid-dispersed to submicroscopic dimensions and mingled with argillaceous matter similarly dispersed, in the presence of acid, and of pectizing principle that pectizes the mingled dispersed matter from the liquid dispersion phase in composite colloid gel form; heating the gel so obtained to temperatures sufficiently high to cause dehydration of the gel and carbonization of the organic component thereof and yet low enough to avoid disruption of the gel structure; and conferring cellularity on the gel by washing it.

8. Preparation of a composite argillaceous-and-organic colloid hydrogel from waste sulphite liquor mingled with argillaceous matter liquid-dispersed to submicroscopic dimensions, in the presence of pectizing principle that pectizes the mingled dispersed matter from the liquid dispersion phase in composite colloid hydrogel form.

9. Preparation of a composite argillaceous-and-organic colloid hydrogel from waste sulphite liquor mingled with argillaceous matter liquid-dispersed to submicroscopic dimensions, in the presence of acid, and of pectizing principle that pectizes the mingled dispersed matter from the liquid dispersion phase in composite colloid hydrogel form.

10. Preparation of a porous substantially non-water-disintegrative composite argillaceous-and-carbon set-gel from a composite argillaceous-and-organic colloid hydrogel first obtained from waste sulphite liquor mingled with argillaceous matter liquid-dispersed to submicroscopic dimensions, in the presence of pectizing principle that pectizes the mingled dispersed matter from the liquid dispersion phase in composite gel form; and then heating the hydrogel so obtained to temperatures sufficiently high to cause dehydration of the gel and carbonization of the organic component thereof and yet low enough to avoid disruption of the gel structure.

11. Preparation of a porous substantially non-water-disintegrative composite argillaceous-and-carbon set-gel from a composite argillaceous-and-organic colloid hydrogel first obtained from waste sulphite liquor mingled with argillaceous matter liquid-dispersed to submicroscopic dimensions, in the presence of acid, and of pectizing principle that pectizes the mingled dispersed matter from the liquid dispersion phase in composite hydrogel form; and then heating the hydrogel so obtained to temperatures sufficiently high to cause dehydration of the gel and carbonization of the organic component thereof and yet low enough to avoid disruption of the gel structure.

12. Preparation of a mordanted porous substantially non-water-disintegrative composite argillaceous-and-carbon set-gel from a composite argillaceous-and-organic colloid hydrogel first obtained from waste sulphite liquor mingled with argillaceous matter liquid-dispersed to submicroscopic dimensions, in the presence of a pectizing mordant that pectizes the mingled dispersed matter from the liquid dispersion phase in composite hydrogel form; and then heating the hydrogel so obtained to temperatures sufficiently high to cause dehydration of the gel and carbonization of the organic component thereof and yet low enough to avoid disruption of the gel structure.

13. Preparation of a porous substantially non-water-disintegrative composite argillaceous-and-carbon set-gel from a composite argillaceous-and-organic colloid hydrogel first obtained from waste sulphite liquor mingled with argillaceous matter liquid-dispersed to submicroscopic dimensions, in the presence of pectizing principle that pectizes the mingled dispersed matter from the liquid dispersion phase in composite hydrogel form; then heating the hydrogel so obtained to temperatures sufficiently high to cause dehydration of the gel and carbonization of the organic component thereof and yet low enough to avoid disruption of the gel structure; and conferring cellularity on the gel by washing it.

14. Preparation of a porous substantially non-water-disintegrative composite argillaceous-and-carbon set-gel from a composite argillaceous-and-organic colloid hydrogel first obtained from waste sulphite liquor mingled with argillaceous matter liquid-dispersed to submicroscopic dimensions, in the presence of acid, and of pectizing principle that pectizes the mingled dispersed matter from the liquid dispersion phase in composite hydrogel form; then heating the hydrogel so obtained to temperatures sufficiently high to cause dehydration of the gel and carbonization of the organic component thereof and yet low enough to avoid disruption of the gel structure; and conferring cellularity on the gel by washing it.

15. Preparation of a compacted porous substantially non-water-disintegrative composite argillaceous-and-carbon set-gel from a composite argillaceous-and-organic colloid hydrogel first obtained from waste sulphite liquor mingled with argillaceous matter liquid-dispersed to submicroscopic dimensions, in the presence of pectizing principle that pectizes the mingled dispersed matter from the liquid dispersion phase in composite hydrogel form; compacting the gel so obtained; heating the compacted gel to temperatures sufficiently high to cause dehydration of the gel and carbonization of the organic component thereof and yet low enough to avoid disruption of the gel structure; and conferring cellularity on the gel by washing it.

16. Preparation of a composite argillaceous-and-organic colloid gel from colloidal clay and organic matter dispersed to submicroscopic dimensions, in the presence of acid, and a pectizing agent.

17. Preparation of a composite argillaceous-and-organic hydrogel from colloidal clay and an aqueous solution of organic matter, in the presence of acid, and a pectizing agent.

18. Preparation of a mordanted composite argillaceous-and-organic colloid gel from colloidal clay and organic matter dispersed to submicroscopic dimensions, in the presence of acid, and a pectizing mordant.

19. Preparation of a mordanted argillaceous-and-organic hydrogel from colloidal clay and an aqueous solution of organic matter, in the presence of acid, and a pectizing mordant.

20. Preparation of a mordanted argillaceous-and-organic hydrogel from colloidal clay and sulphite liquor, in the presence of acid, and a pectizing mordant.

21. Preparation of a mordanted argillaceous-and-organic hydrogel from colloidal clay and concentrated sulphite liquor, in the presence of acid, and a pectizing mordant.

22. Preparation of a composite argillaceous-and-organic colloid gel from colloidal clay dispersed by physical media to submicroscopic dimensions and organic matter dispersed to submicroscopic dimensions, in the presence of acid, and a pectizing agent.

23. Preparation of a partially set composite argillaceous-and-organic colloid gel from colloidal clay and organic matter dispersed to submicroscopic dimensions, in the presence of acid, and a pectizing agent; and subjecting the colloid gel thus obtained to pre-drying temperatures low enough to avoid charring of the organic component thereof.

24. Preparation of a compacted composite argillaceous-and-organic colloid gel from colloidal clay and organic matter dispersed to submicroscopic dimensions, in the presence of acid, and a pectizing agent; and compacting the colloid gel thus obtained.

25. Preparation of a porous composite argillaceous-and-carbon colloid set-gel from a composite argillaceous-and-organic colloid gel first obtained from colloidal clay and organic matter dispersed to submicroscopic dimensions, in the presence of acid, and a pectizing agent; and then subjecting the colloid gel thus obtained to heat-treatment at temperatures sufficiently high to cause charring of the organic component of the gel without decomposition thereof and to bring about conversion thereof into porous set-gel form.

26. Preparation of a porous composite argillaceous-and-carbon set-gel from a composite argillaceous-and-organic colloid gel first obtained from colloidal clay and organic matter dispersed to submicroscopic dimensions, in the presence of acid, and a pectizing agent; next subjecting the colloid gel thus obtained to heat-treatment at temperatures sufficiently high to cause charring of the organic component of the colloid gel without decomposition thereof and to bring about its conversion into porous set-gel form; and washing the set-gel to lend greater porosity thereto.

27. Preparation of a porous composite argillaceous-and-carbon set-gel from a composite argillaceous-and-organic colloid gel first obtained from colloidal clay and organic matter dispersed to submicroscopic dimensions, in the presence of acid, and a pectizing agent; next subjecting the colloid gel thus obtained to heat-treatment at temperatures sufficiently high to cause charring of the organic component of the colloid gel without decomposition thereof and to bring about its conversion into porous set-gel form; and washing the set-gel with acid to confer greater porosity thereon.

28. Preparation of a composite gel from colloidal clay and sulphite liquor in the presence of a strong mineral acid, drying the colloid gel so obtained without decomposition thereof, and washing the residue with an acid.

Signed at Warren, in the county of Warren and State of Pennsylvania, this 31st day of January, 1927.

ROY G. TELLIER.